Figure 1:
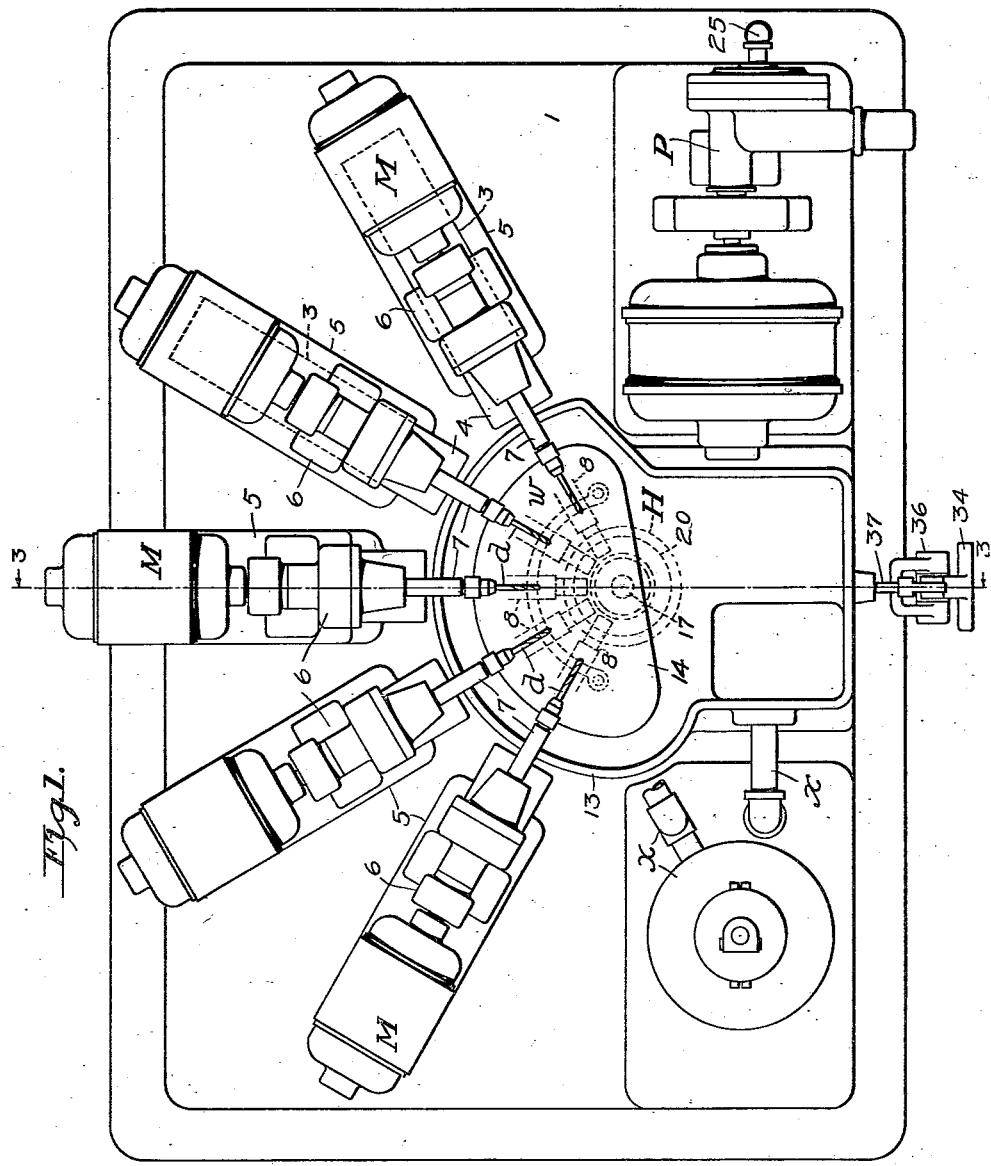

Oct. 6, 1931.  C. H. MUHL  1,825,971
DRILL UNIT WITH COMMON FEED
Filed June 1, 1928       4 Sheets-Sheet 1

Inventor
Charles H. Muhl
By  Attorney
Nathan T Bowman

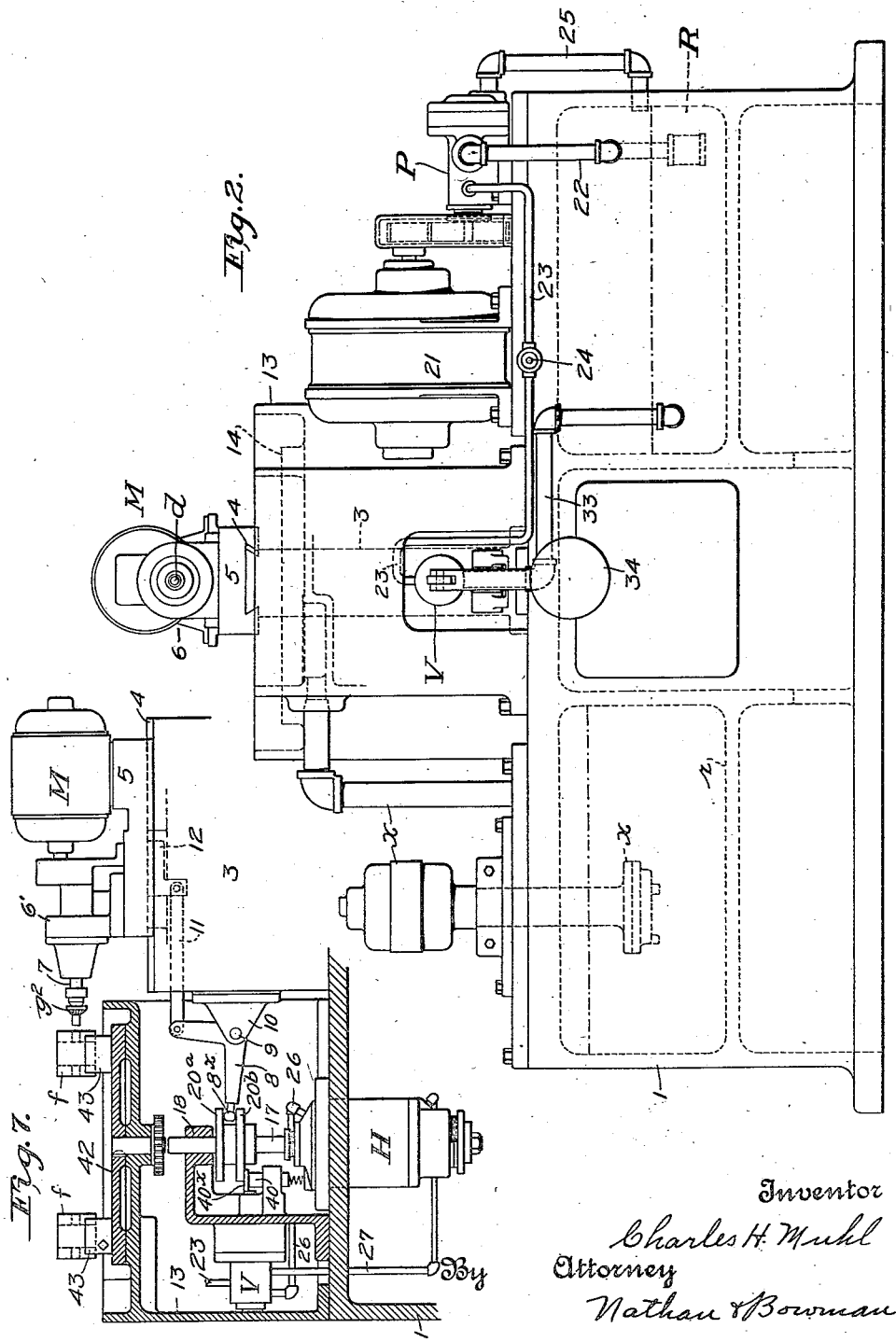

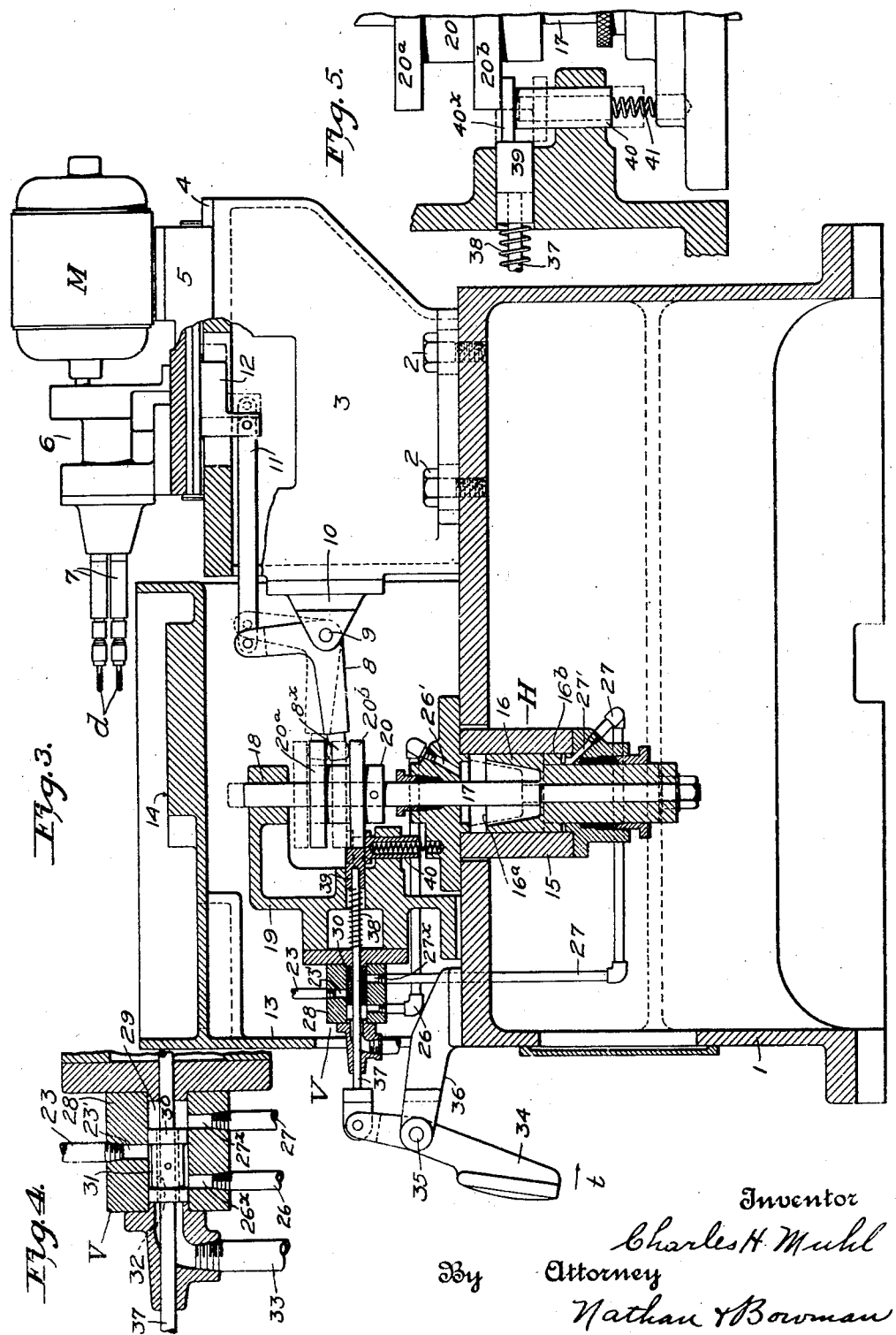

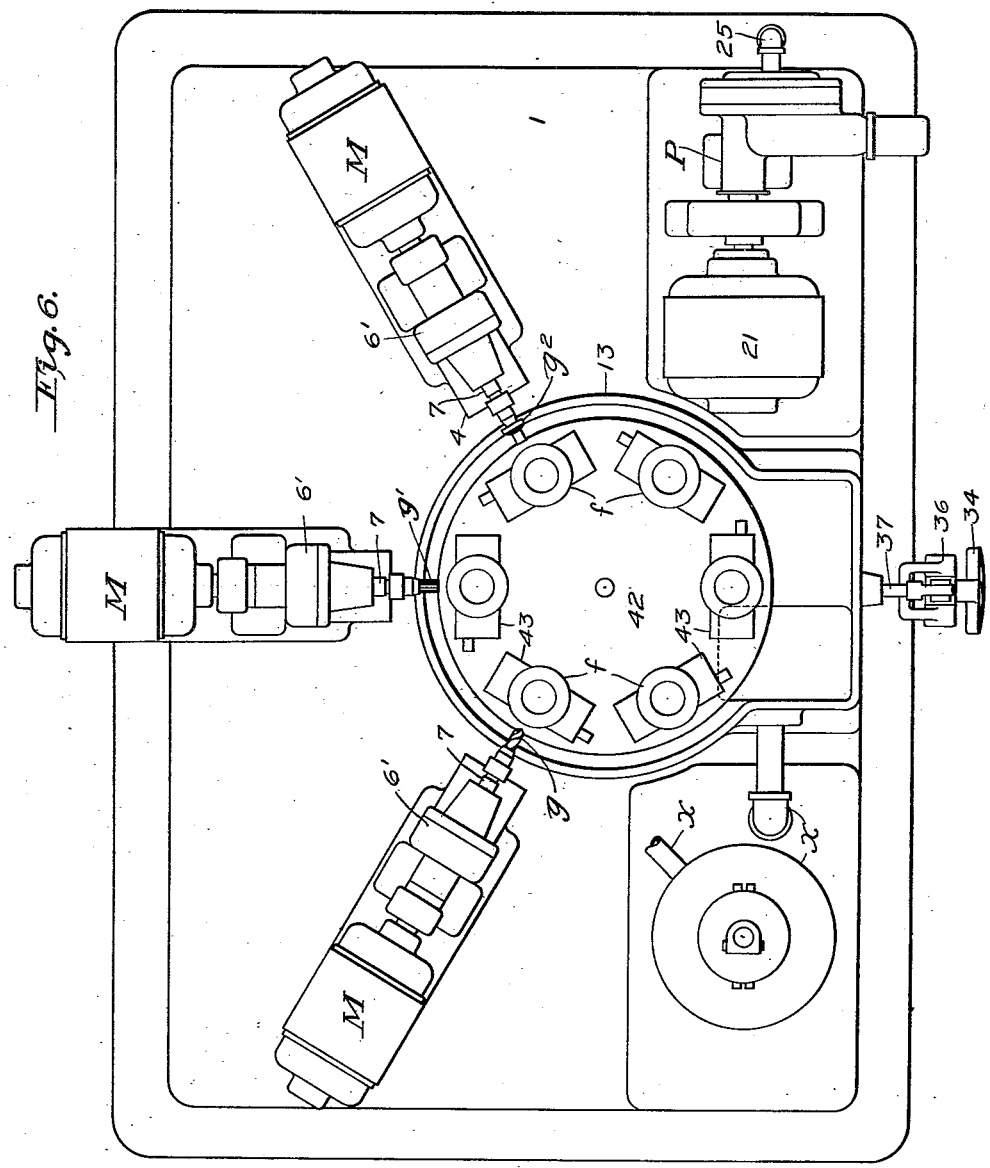

Patented Oct. 6, 1931

1,825,971

UNITED STATES PATENT OFFICE

CHARLES H. MUHL, OF RICHMOND, INDIANA, ASSIGNOR TO THE NATIONAL AUTOMATIC TOOL COMPANY, OF RICHMOND, INDIANA, A CORPORATION OF INDIANA

DRILL UNIT WITH COMMON FEED

Application filed June 1, 1928. Serial No. 282,141.

This invention deals with machine tools and it relates more particularly to machine tools of that type adapted simultaneously to perform a plurality of machining operations.

The primary object of this invention is to render available a single improved feed-actuating means for simultaneously giving to a plurality of suitable tool-carriers advance and retractive movements, whereby a plurality of machining operations simultaneously may be performed upon one or a plurality of work-pieces.

Another object of the invention is to provide, in a machine tool of the type above described, a plurality of translatable tool-carriers and to provide a single hydraulic motor and an individual operative connection between said motor and each of said carriers for simultaneously actuating all of said tool-carriers from said motor.

Still another object of the invention is to provide a single hydraulic motor and individual connections for simultaneously actuating a plurality of tool-carriers; to provide manual means for starting said motor and to combine therewith automatically actuated means for thereafter controlling the action of said motor, and incidentally the movements of said tool-carriers, and finally bringing said motor and tool-carriers to rest after a plurality of machining operations simultaneously have been performed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a plan of a multiple drilling machine, embodying the present invention, in which all of the tools are adapted simultaneously to operate upon a single work-piece, shown in dotted lines. Fig. 2 is a front elevation of the machine shown in Fig. 1, only one tool-carrier, however, being shown. Fig. 3 is a central vertical section on the line 3—3 of Fig. 1. Fig. 4 is a detail sectional view showing, on an enlarged scale, the valve which controls the flow of fluid to the hydraulic motor. Fig. 5 is an enlarged detail of the automatic valve controlling mechanism. Fig. 6 is a plan of a station type machine embodying the present invention. In this form a rotatable work-table carries a plurality of work-pieces and presents them successively to the action of a plurality of tools carried by simultaneously actuated tool-carriers. Fig. 7 is a detail sectional view showing more particularly the mounting of the rotatable work-table.

Referring more specifically to the drawings, and particularly to Figs. 1 to 5 inclusive, the invention is disclosed as embodied in a multiple drilling machine in which all of the drills are adapted simultaneously to operate upon a single work-piece $w$ shown in dotted lines only in Fig. 1. The machine preferably comprises a main frame or base 1 upon which are adjustably supported, as by bolts 2, a plurality of sub-frames 3 provided at their upper faces with slideways 4, to which are slidingly fitted carriages 5 of a plurality of tool-heads or carriers 6. These tool-carriers may be of any suitable or preferred form but preferably they will be constructed as shown and each head will comprise one or more tool-spindles 7, a driving motor M, and a suitable driving connection between the motor and the spindle (or spindles). Each of the spindles is provided with a suitable tool such, for example, as the drills $d$.

Mechanism is provided for translating each of the carriages 5 on the guideways 4. This mechanism preferably comprises a bell-crank lever 8, fulcrumed at 9 on a bracket 10, supported by each of the sub-frames 3. One arm of each of the bell-crank levers is connected with one end of a link 11 whose other end is connected with a bracket 12 fixed to the carriage 5. The other arm of each bell-crank is connected to a common actuator, later to be described, whereby all of the bell-crank levers are actuated simultaneously, thereby simultaneously translating the tool-carriers.

Mounted upon the upper surface of the main frame is an element 13, which serves as a work-support and as a collector for the cutting compound. This element is formed with a surface 14 upon which is adapted to be secured any suitable fixture (not shown) to hold the work-piece $w$.

As hereinbefore stated, a common actuator is provided for simultaneously actuating all of the tool-carrier translating mechanisms. This actuator preferably is in the form of a hydraulic motor H comprising a cylinder 15 supported by the main frame with its axis transverse to the paths of movement of the tools. A piston 16 is slidingly fitted within the cylinder 15 and is attached to one end of a piston rod 17 whose other end is slidingly fitted in a bearing 18 provided by a bracket 19, also supported by the main frame. Upon the rod 17 there is fixed a spool 20 between the flanges $20^a$ and $20^b$ of which are arranged the ends $8^x$ of the bell-crank levers 8. By reason of this connection the bell-crank levers 8 are rocked counter-clockwise as viewed in Fig. 3, every time the piston and the spool are moved from their dotted line positions to the positions shown in full lines. This movement of the bell-crank levers effects simultaneously, through the links 11, advance movement of the tool carriers to produce the cutting stroke of the tools. As the piston and the spool 20 are moved from the full line positions to their dotted line positions, the bell-crank levers are rocked clockwise, thereby effecting simultaneous retraction of the tool-carriers.

To effect a relatively slow forward feed of the tools as they are performing their cutting operations, and then rapidly to retract the tools, the piston 16 is of the differential type i. e., the effective area of the end $16^a$ of the piston against which the fluid under pressure operates to produce the forward feed is relatively large, whereas the effective area of the opposite end $16^b$ of the piston is relatively small. Thus it will be seen that fluid flowing into the opposite ends of the cylinder at a constant rate will move the piston in opposite directions at materially different rates.

To provide fluid pressure to actuate the hydraulic motor H, there is mounted upon the main frame 1, a pump P, which is driven from a motor 21 also mounted upon said frame. The pump P is adapted to draw fluid (preferably oil) from a reservoir R, formed in the main frame, through a pipe 22, and exhaust it through a pressure line 23. The rate of flow through the line 23 is regulated by a valve 24 and the pressure therein is controlled by a suitable relief valve (not shown) in the pump, and by a by-pass line 25. Fluid under pressure in the line 23 is transmitted alternately to the upper and lower ends of the cylinders 15 through conduits 26 and 27 and ports 26' and 27' by the action of a control valve designated generally as V. This valve comprises a cylinder 28 formed with a bore 29 and a piston 30 slidably fitted within said bore. The piston 30 is formed, intermediate its ends, with an annular groove 31 adapted, in one position of the piston (Fig. 4), to afford a passage for fluid from a port 23' in the cylinder 28, (with which the pressure line 23 communicates) with a port $26^x$ in communication with the conduit 26. This admits fluid under pressure into the upper end of the cylinder 15 of the hydraulic motor H, which causes the piston 16 to be moved downwardly to effect the cutting feed of the tools. During the downward movement of the piston 16 fluid in the opposite end of the cylinder 15 is exhausted, through conduit 27 and port $27^x$ in the valve cylinder 28, into the bore 29, thence through a central bore 32, in the valve piston 30, to an exhaust line 33 which leads back to the reservoir R. In the other position of the valve, piston 30 (see Fig. 3) the annular groove 31 connects the intake port 23' with the port $27^x$, thereby transmitting fluid under pressure to the conduit 27 leading to the bottom of the motor cylinder 15, and effecting upward movement of the piston, and consequently retraction of the tool carriers, at a relatively rapid rate. During this movement of the piston 16 fluid is exhausted from the upper end of the cylinder 15 through conduit port 26', conduit 26, port $26^x$, bore 29, and exhaust line 33. The effective areas of the ends $16^a$ and $16^b$, of the piston 16, are so coordinated with respect to the constant rate of flow through the pressure line 23 that the piston 16 is moved in opposite directions at the required rates to give to the tool-carriers advance and retractive movements at the most efficient rates.

After a drilling operation the machine comes to rest with the piston 16, spool 21 and bell-crank levers in the positions shown in dotted lines in Fig. 3 and with the tool-carriers in their retracted positions. To initiate a new cycle the operator swings the starting lever 34 in the direction indicated by the arrow $t$. This lever is fulcrumed at 35 to a bracket 36 and has its upper end connected with a slide rod 37 to which the valve piston 30 is affixed. Movement of the lever 34 in the direction indicated by the arrow pulls the rod 37, and valve piston 30, to the left (as viewed in Figure 3) in opposition to a spring 38. This shifts the valve piston 30 to the position shown in Fig. 4 which connects the pressure line 23 with the conduit 26 and thereby effects downward movement of the motor piston 16. In the stop position of the parts, a collar 39 fixed upon the rod 37 overlies a spring-pressed interference member 40, as shown in dotted lines, Fig. 5. As the rod 37 is moved to the left the collar 39 clears the head 40$^x$ of the interference member 40 and it is immediately elevated, by the spring 41, to the position shown in full lines, Fig. 5, in which position the head 40$^x$ underlies the flange 20$^b$ of the spool 20 and the side of the head engages the end of the collar 39, thereby preventing the collar, rod 37, and valve-piston from moving to the right under the influence of the spring 38.

As the piston 16 is depressed the flange 20$^b$ depresses the interference member 40 and. when the tools have entered the work a predetermined distance, the head 40$^x$ clears the end of the collar 39, thereby permitting the collar, rod 37, and valve piston 30, automatically to be shifted by the spring 38 to the positions shown in Fig. 3, to effect upward movement of the piston 16 and retraction of the tool-carriers.

Suitable means, designated generally as $x$, is provided for drawing cooling compound from a reservoir formed in the main frame and delivering it to the tools and work and for returning it to said reservoir. Inasmuch as this coolant system forms no part of the present invention detailed illustration and description thereof is deemed unnecessary.

Figs. 6 and 7 show the invention embodied in a station-type machine tool. i. e., one in which work-pieces are presented successively to the action of a plurality of individual tools.

The machine illustrated in Figures 6 and 7 comprises a main frame 1, similar to that of Figs. 1 to 5 inclusive. Upon the frame is rotatably mounted a table 42 which carries a plurality of suitably formed work-holders 43 adapted to hold work-pieces $f$ and, upon indexing of the table, successively to present them to the action of like or unlike tools, $g$, $g^1$ and $q^2$ carried by the tool-carriers 6' which are similar to the tool-carriers or heads 6 hereinbefore described. All of the carriers 6' are actuated by a common hydraulic motor the same as described with reference to Figs. 1-5.

The table 42 may be indexed by hand or any suitable or preferred indexing mechanisms may be provided if desired. Also suitable locking means may be provided for holding the table against accidental displacement during the machining operations.

In view of the fact that the tool heads 6 and the actuating means therefor are the same in Figs. 6 and 7 as in Figs. 1 to 5 inclusive the same reference characters have been applied thereto.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A machine tool combining a main frame; a plurality of sub-frames adjustably secured to said main frame each of said sub-frames affording a guideway; a tool-head translatably mounted on each of said guideways; a differential hydraulic motor supported by said frame with its axis transverse to the paths of movement of said tool-heads and adapted to reciprocate said tool-heads in opposite directions at different rates; individual operative connections between said motor and said tool-heads; a hydraulic pressure system comprising a reservoir formed in said main frame; a continuously acting pump adapted to draw fluid from said reservoir; conduits to transmit fluid under pressure from said pump into opposite ends of said motor; a valve to control the flow of fluid through said conduits; manual means to shift said valve to start said motor; and automatic means to shift the valve to stop said motor.

2. A machine tool combining a plurality of translatable tool-heads; a single hydraulic motor common to all of said tool-heads, said motor comprising a cylinder, a piston rod and a differential piston fixed to said rod and slidable in said cylinder between said piston rod and said tool-heads; a fluid pressure line; conduits connecting said fluid pressure line with said cylinder at opposite ends of said differential piston; valve means intermediate said pressure line and said conduits and adapted alternately to admit fluid into said conduits; manual means to actuate said valve to admit fluid into the conduit connected with the cylinder at the end of said piston having the greatest effective area thereby to effect a relatively slow forward feed of said tool-heads; and automatic means to actuate said valve to admit fluid into the other end of said cylinder to effect rapid retraction of said heads.

3. A machine tool combining a main frame; a plurality of sub-frames adapted to be secured to said main frame in various angular positions, each of said sub-frames affording a guideway in its upper face; a tool carrier, including a rotary spindle and means to rotate it, translatably mounted on the guideway of each of said sub-frames; a hydraulic motor supported by said main frame with its axis transverse to the paths of movement of said tool carrier, said hydraulic motor including a piston rod; a spool on said piston rod; and individual operative connections between said motor and said tool carriers simultaneously to actuate said carriers, each of said operative connections comprising a bell-crank lever having one arm adjustably connected with said spool and the other arm operatively connected with one of said tool carriers.

4. A machine tool combining a plurality of individual translatable tool-carriers; a single hydraulic motor common to all of said carriers arranged with its axis transverse to the paths of movement of said tool carriers; individual operative connections between the piston rod of said motor and said carriers, simultaneously to advance and simultaneously to retract all of said carriers, said connections comprising an element on said piston rod and individual bell crank levers each having one end engaging said element and its other end connected with one of said tool carriers; fluid pressure conduits connected with opposite ends of said motor; a valve controlling the flow of fluid through said conduits; manual means to actuate said valve to effect advance movement of said tool carriers; means tending to shift said valve to a position to effect retraction of said carriers; interference means to restrain said valve against movement, said interference means comprising a spring pressed element movable substantially parallel with said piston rod, and adapted to be moved to a position to prevent movement of said valve to a carrier-retracting position, and means actuated by the piston rod to render said interference means ineffective.

5. A machine tool combining a plurality of individual translatable tool-carriers; a single hydraulic motor for actuating all of said tool-carriers, said motor comprising a cylinder, a piston within said cylinder and a piston rod connected with said piston; a member carried by said piston rod; individual operative connections between said member and said tool-carriers each of said connections comprising a bell-crank lever fulcrumed on said frame and having one arm connected with said member and the other arm connected with one of said tool-carriers; fluid pressure conduits connected with opposite ends of said motor; a valve controlling the flow of fluid through said conduits; manual means to actuate said valve to effect advance movement of said carriers; means tending to shift said valve to a position to effect retractive movement of said carriers; interference means to restrain said valve against movement; and automatically actuated means to render said interference means ineffective.

6. A machine tool combining a main frame; a central work-support; a plurality of sub-frames adjustably yet fixedly secured to said main frame at various angles about said work support; a tool-carrier translatably mounted on each sub-frame; a single hydraulic motor, including a piston rod and a collar on said piston rod having an annular rib, supported by said main frame; an operative mechanical connection between said motor and each of said tool carriers simultaneously to advance and simultaneously to retract all of said carriers, each of said connections comprising a bell-crank lever pivoted upon the sub-frame and having one arm engaging said rib and the other arm connected with said carrier; and means to supply fluid pressure to said motor.

7. A station-type machine tool combining a frame; a rotatable work-supporting table supported by said frame; a plurality of individual tool-heads mounted on said frame about said table each of said tool-heads comprising a sub-frame, a carriage translatable on said sub-frame, and a rotatable spindle and individual means to rotate it carried wholly by said carriage; a tool carried by each spindle said tools being adapted successively to operate on work-pieces carried by said table; a single hydraulic motor having a piston rod and arranged with its axis transverse to the paths of movement of said carriages; individual operative connections between said motor and each of said tool-heads said connections comprising a collar on said piston rod, individual bell crank levers fulcrumed on said tool heads each having one arm connected with said collar and the other arm connected with the tool carriage; and means to control the action of said hydraulic motor.

In witness whereof, I hereunto subscribe my name.

CHARLES H. MUHL.